(12) United States Patent
Khazanovitch et al.

(10) Patent No.: US 10,235,188 B2
(45) Date of Patent: Mar. 19, 2019

(54) METHOD AND SYSTEM FOR DYNAMIC LOADING OF INCREMENTAL CHANGES OF SOFTWARE

(71) Applicant: Dell Products L.P., Round Rock, TX (US)

(72) Inventors: Alexander Khazanovitch, Haifa (IL); Yakov Persky, Holon (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/586,838

(22) Filed: May 4, 2017

(65) Prior Publication Data

US 2018/0321953 A1    Nov. 8, 2018

(51) Int. Cl.
| | |
|---|---|
| *G06F 9/445* | (2018.01) |
| *G06F 9/44* | (2018.01) |
| *G06F 8/71* | (2018.01) |
| *G06F 9/448* | (2018.01) |
| *G06F 8/658* | (2018.01) |
| *G06F 8/65* | (2018.01) |

(52) U.S. Cl.
CPC ............ *G06F 9/44521* (2013.01); *G06F 8/65* (2013.01); *G06F 8/658* (2018.02); *G06F 8/71* (2013.01); *G06F 9/4488* (2018.02)

(58) Field of Classification Search
CPC ...... G06F 9/44521; G06F 9/445; G06F 9/443; G06F 9/465; G06F 9/4428

USPC .......................................................... 717/166
See application file for complete search history.

(56) References Cited

U.S. PATENT DOCUMENTS

| | | | | |
|---|---|---|---|---|
| 7,913,246 | B2 * | 3/2011 | Hammond | ............... G06F 8/65 |
| | | | | 340/538 |
| 9,178,746 | B2 * | 11/2015 | Yeung | ................. G06F 9/44521 |
| 9,411,618 | B2 * | 8/2016 | Elias | ................... G06F 9/44521 |
| 2017/0011087 | A1 * | 1/2017 | Hyde | ............... G06F 17/30563 |

\* cited by examiner

*Primary Examiner* — John Q Chavis
(74) *Attorney, Agent, or Firm* — Pearl Cohen Zedek Latzer Baratz LLP

(57) ABSTRACT

A method and a system for dynamic loading of incremental changes of software in a centralized data management system are provided herein. The method may include the following steps: requesting to load a specified code portion for a specified version of the software; checking if the specified code portion is provided by a specified software package associated with the specified version; in a case that the specified code portion is provided by the specified software package, loading the class from the specified package; in a case that the specified code portion is not provided by the specified software package, iteratively checking in earlier packages upon which the specified package depends, until the specified code portion is found; and loading the specified code portion from the earlier package where the specified code portion is found.

15 Claims, 4 Drawing Sheets

METHOD AND SYSTEM FOR DYNAMIC LOADING OF INCREMENTAL CHANGES OF SOFTWARE

FIELD OF THE INVENTION

The present invention relates generally to the field of software updates, and more particularly to updating versions of software in a centralized computing system.

BACKGROUND OF THE INVENTION

Prior to setting forth the background of the invention, it may be helpful to set forth definitions of certain terms that will be used hereinafter.

The term "plug-in" or "plugin" as used herein is defined as a software component that adds a specific feature to an existing computer program. When a program supports plug-ins, it enables customization.

The term "dynamic loading as used herein is defined a mechanism by which a computer program can, at run time, load a library (or other binary) into memory, retrieve the addresses of functions and variables contained in the library, execute those functions or access those variables, and unload the library from memory. Dynamic loading is one of the three mechanisms by which a computer program can use some other software; the other two are static linking and dynamic linking.

Unlike static linking and dynamic linking, dynamic loading allows a computer program to start up in the absence of these libraries, to discover available libraries, and to potentially gain additional functionality.

In any centralized computerized management system that deals with multiple versions of the same software product (for example, a file system) at the same time, there is a challenge in addressing version upgrade of the software product.

Specifically, whenever a new functionality is added to the product it becomes necessary to also upgrade the centralized management system. This is disadvantageous because it is both time consuming and expensive in processor usage terms.

Dynamically loading plugins for coexisting versions may lead to a problem. This is because the difference between the plugins of the different version is minor so dynamically loading them results in redundantly loading the same code for each one of them unnecessarily.

SUMMARY OF THE INVENTION

In order to address the drawbacks of the prior art, some embodiments of the present invention suggest to apply an incremental approach to dynamic loading of changes, where a centralized management system manages simultaneously different versions of the same product In a case of a plugin, this is achieved by loading only the differences between the plugins wherein each plugin depends on previous version. Additionally, the code which was not changed in a newer plugin version is loaded from a previous version plugin.

Some embodiments of the present invention provide method and a system for dynamic loading of incremental changes of software in a centralized data management system are provided herein. The method may include the following steps: requesting to load a specified code portion for a specified version of the software; checking if the specified code portion is provided by a specified software package associated with the specified version; in a case that the specified code portion is provided by the specified software package, loading the class from the specified package; in a case that the specified code portion is not provided by the specified software package, iteratively checking in earlier packages upon which the specified package depends, until the specified code portion is found; and loading the specified code portion from the earlier package where the specified code portion is found.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
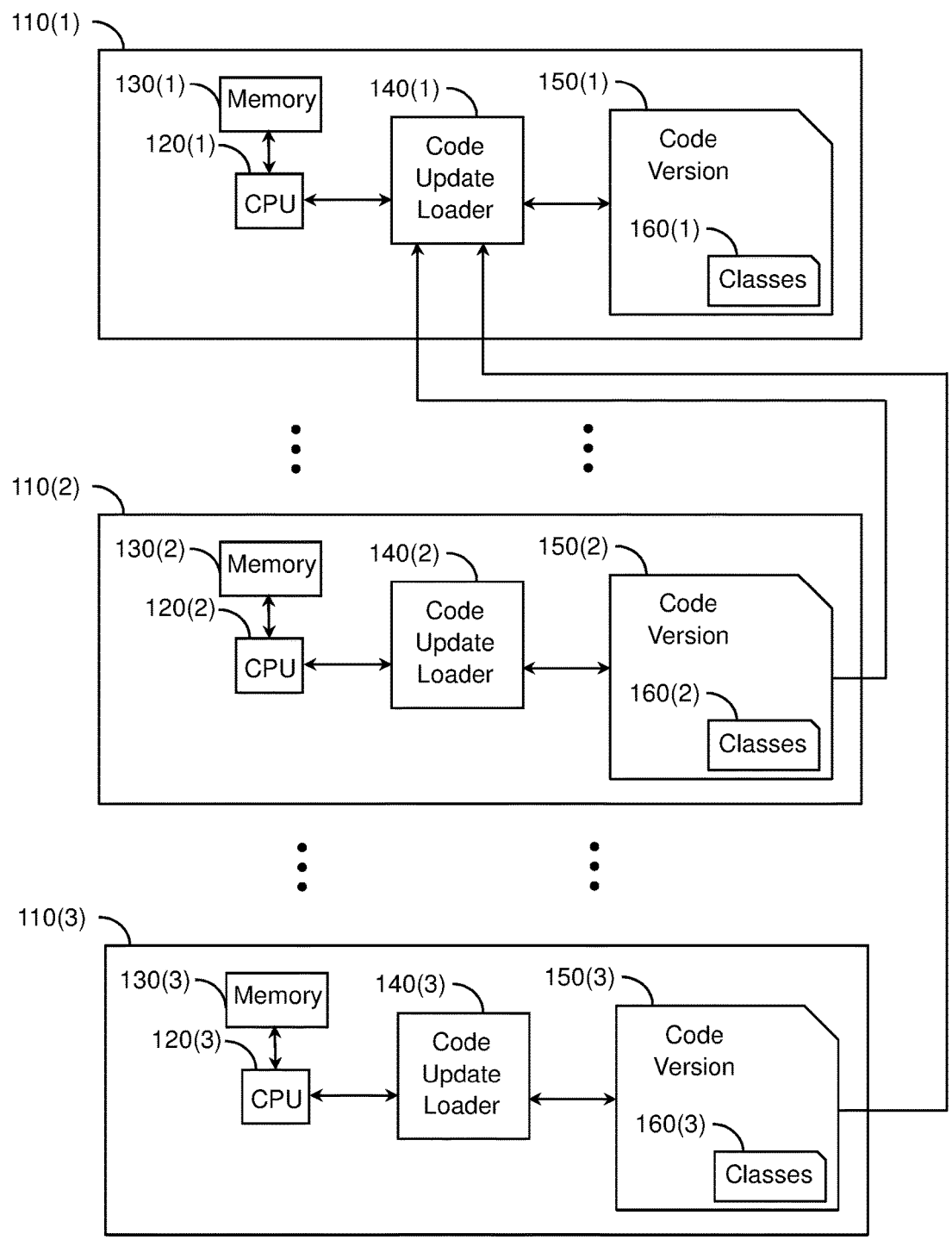
FIG. 1 is a block diagram illustrating non-limiting exemplary architecture of a system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In order to address the drawbacks of the prior art, some embodiments of the present invention suggest to apply an incremental approach to dynamic loading of changes, where a centralized management system manages simultaneously different versions of the same product In a case of a plugin, this is achieved by loading only the differences between the plugins wherein each plugin depends on previous version. Additionally, the code which was not changed in a newer plugin version is loaded from a previous version plugin.

Following is a non-limiting implementation of some embodiments of the present invention in which a dedicated code update loader will be used to manage each version of the software product packages.

FIG. 1 is a block diagram illustrating an architecture according to some embodiments of the present invention. Centralized data management system 100 may include a plurality of interconnected nodes 110(1) to 110(3) of a common centralized data management system 100. Each of nodes 110(1) to 110(3) include a respective computer processor 120(1) to 120(3), a respective memory 130(1) to 130(3), and a code update loader 140(1) to 140(3) running on respective computer processor 120(1) to 120(3). In addition, each of nodes 110(1) to 110(3) runs a respective code version 150(1) to 150(3) which is associated with a software package.

In operation, and in accordance with some embodiments of the present invention, node 110(1) is a master node while nodes 110(2) and 110(2) are slave nodes. Code update loader 140(1) of node 110(1) may be configured to: request from nodes 110(2) and 110(2) to load a specified code portion for a specified version of the software; and consolidate all specified code portions in code version 150(1) located on node 110(1) for use by other nodes.

This architecture allows coexistence of code portions such as program-code-template for creating objects (e.g. classes) with the same name and path in different versions of software product packages.

Figure 2:
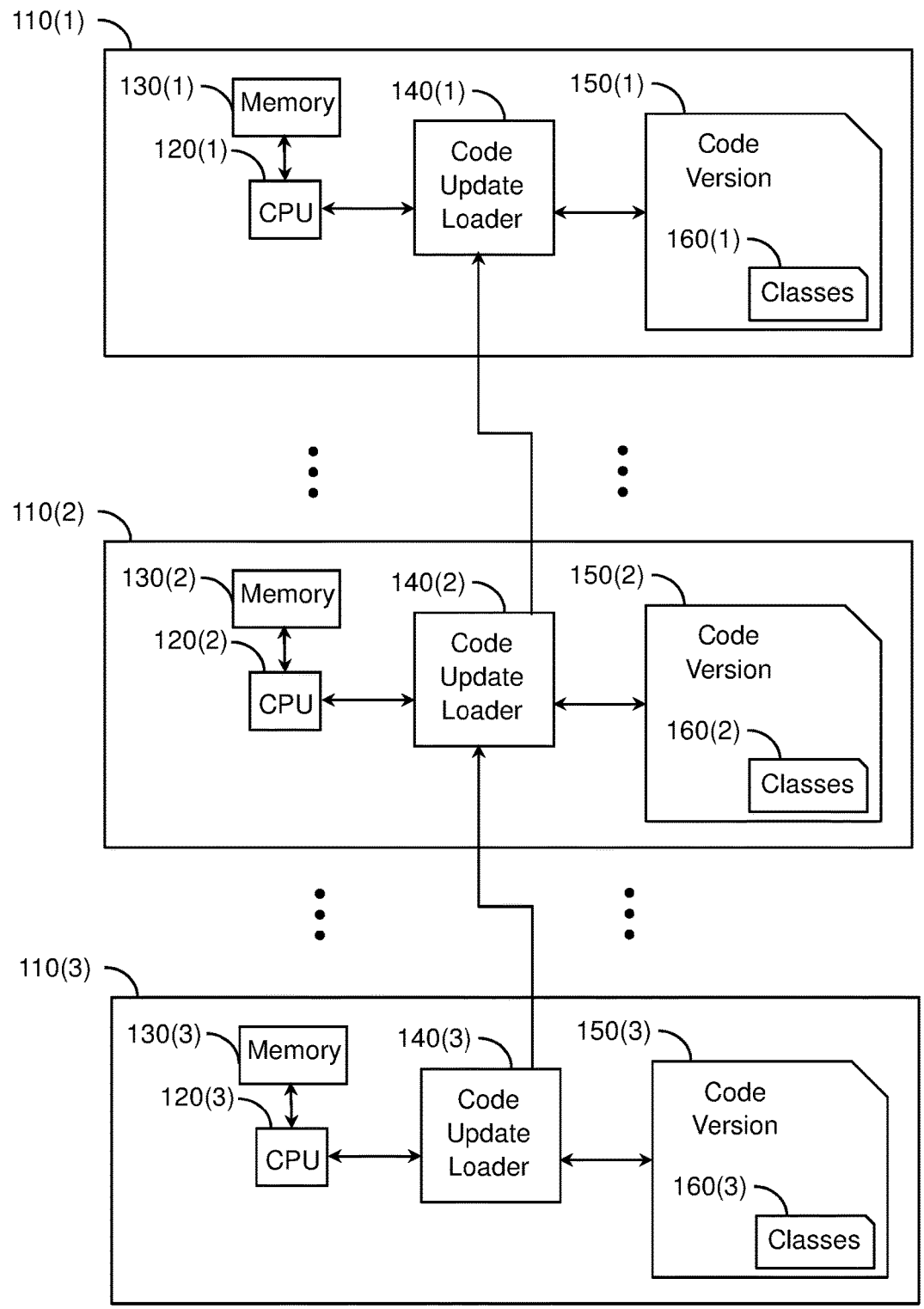
FIG. 2 is a block diagram illustrating another non-limiting exemplary architecture of a system in accordance with embodiments of the present invention.

FIG. 2 is a block diagram illustrating another architecture according to some embodiments of the present invention. Centralized data management system 100 may include a plurality of interconnected nodes 110(1) to 110(3) of a common centralized data management system 100. Each of nodes 110(1) to 110(3) include a respective computer processor 120(1) to 120(3), a respective memory 130(1) to 130(3), and a code update loader 140(1) to 140(3) running on respective computer processor 120(1) to 120(3). In addition, each of nodes 110(1) to 110(3) runs a respective code version 150(1) to 150(3) which is associated with a software package.

According to this architecture, code update loader serves separate package version and can depend on previous version. In operation, and in accordance with some embodiment soft the present invention, each code update loader 140(1) to 140(3) of each of nodes 110(1) to 110(3) may be configured to: request to load a specified code portion for a specified version of the software; check if the specified code portion is provided by a specified software package associated with the specified version; in a case that the specified code portion is provided by the specified software package, load the class from the specified package; in a case that the specified code portion is not provided by the specified software package, iteratively check in earlier packages upon which the specified package depends, until the specified code portion is found; and load the specified code portion from the earlier package where the specified code portion is found.

According to some embodiments of the present invention, the code portion may include program-code-template for creating objects (e.g. classes 160(1) to 160(3)).

According to some embodiments of the present invention, the specified version of the software may include a software plugin.

According to some embodiments of the present invention, centralized data management system 100 may include a file system.

According to some embodiments of the present invention, the code update loader may be further configured to load specified code portion while preserving same name and path on different versions of all of the packages.

Figure 3:
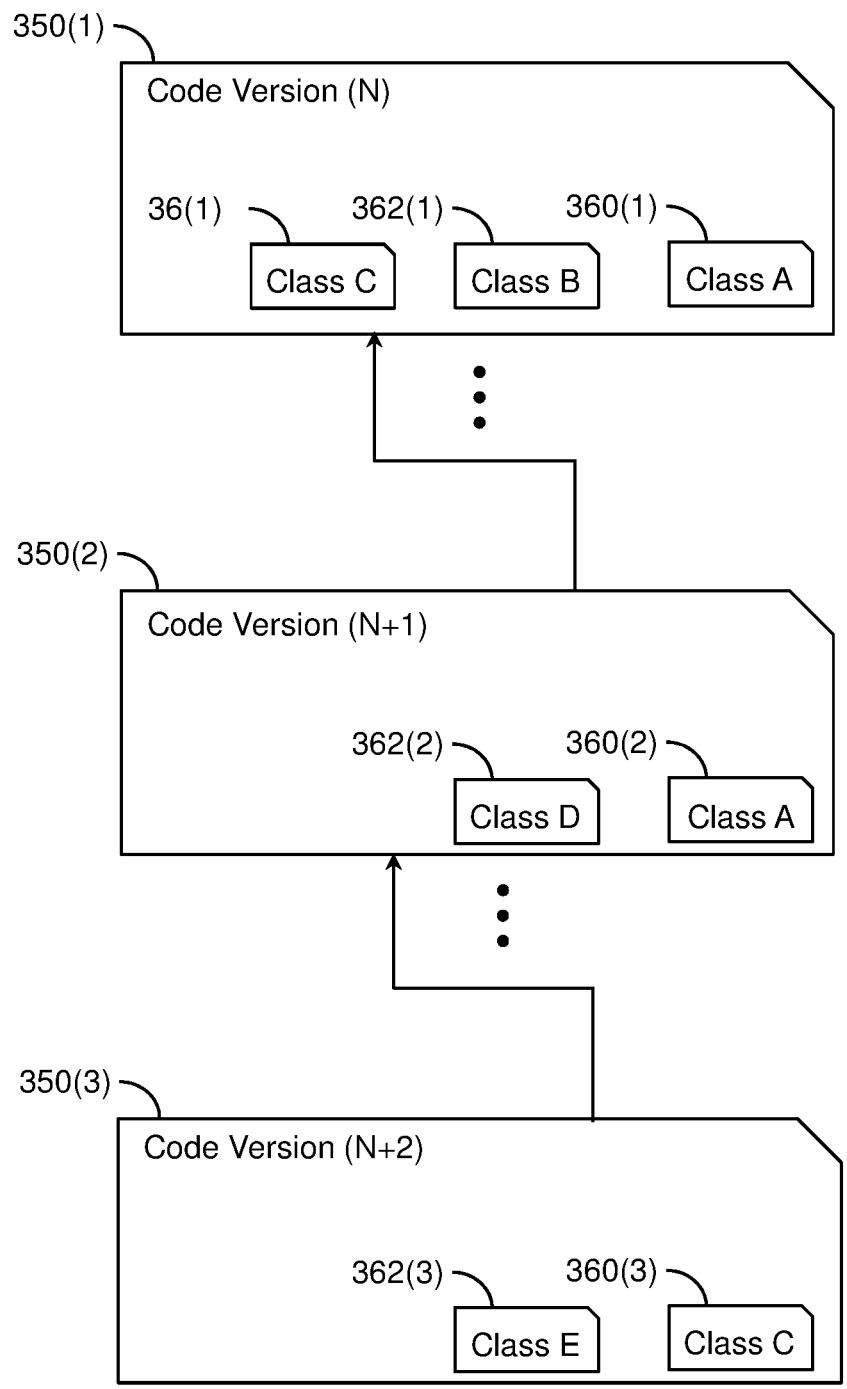
FIG. 3 is a block diagram illustrating an aspect of a system in accordance with embodiments of the present invention.

FIG. 3 is a block diagram illustrating an aspect of a system in accordance with some embodiments of the present invention. Various code versions 350(1) to 350(3) are provided on various nodes (note shown here). Each of code versions 350(1) to 350(3) may provide only part of the classes 360(1) to 364(1), 360(2) to 362(2), and 360(3) to 362(2) that are required to load full functionality. It is noted however that the root package must have all of classes 360(1) to 364(1), 360(2) to 362(2), and 360(3) to 362(2). In accordance with some embodiments of the present invention, software product packages may be stored on a local directory on client machine. An exemplary package filename may be of the following format:

fluidfs_<pckg_name>_v<package_version>.jar.

In accordance with some embodiments of the present invention, during an initialization phase, a code update loader may remove unnecessary packages.

Figure 4:
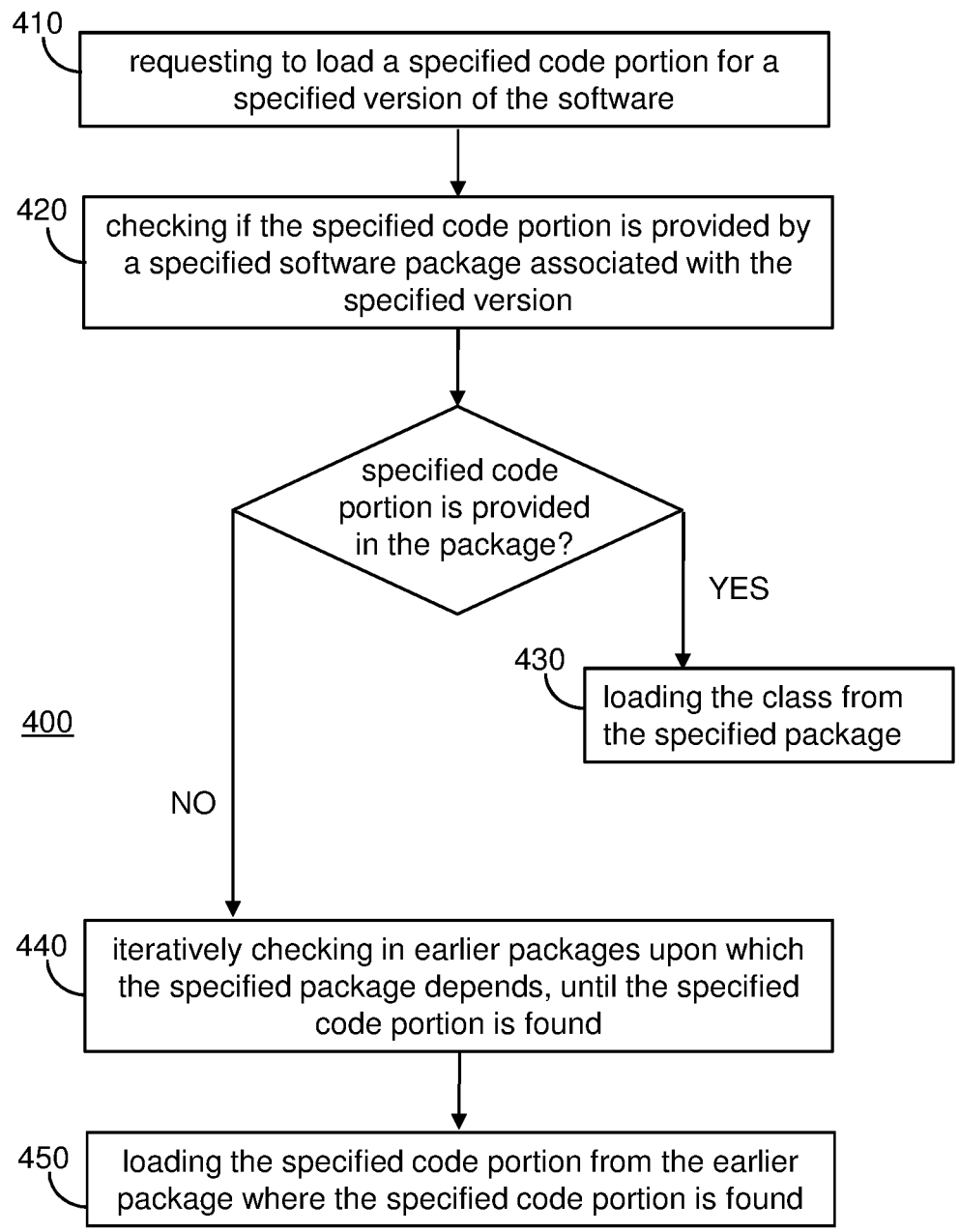
FIG. 4 is a flowchart illustrating a method in accordance with embodiments of the present invention.

FIG. 4 is a flowchart illustrating a method for dynamic loading of incremental changes of software in a centralized data management system in accordance with embodiments of the present invention. Method 400 may include the following steps: requesting to load a specified code portion for a specified version of the software 410; checking if the specified code portion is provided by a specified software package associated with the specified version 420; in a case that the specified code portion is provided by the specified software package, loading the class from the specified package 430; in a case that the specified code portion is not provided by the specified software package, iteratively checking in earlier packages upon which the specified package depends, until the specified code portion is found 440; and loading the specified code portion from the earlier package where the specified code portion is found 450.

In a specific non-limiting case and in accordance with some embodiments of the present invention, when the code to be loaded include class loading, the flow may be as follows:

Request to load class A for version X;
Check if class is provided by package with version X;
In case it is provided—load the class from package X;
If case it is not provided—check if it is provided by package that X depends on; and
Continue through package dependency chain until first package providing the class A is found.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for dynamic loading of incremental changes of software in a centralized data management system, the method comprising:
   requesting to load a specified code portion for a specified version of the software;
   checking if said specified code portion is provided by a specified software package associated with said specified version;
   in a case that said specified code portion is provided by said specified software package, loading the class from the specified package;
   in a case that said specified code portion is not provided by said specified software package, iteratively checking in earlier packages upon which the specified package depends, until said specified code portion is found; and
   loading said specified code portion from the earlier package where said specified code portion is found, wherein
   wherein the specified code portion for the specified version of the software is a software plugin, wherein the software is a file system software and wherein the software plugin preserves same name and path in different versions of all of the packages.

2. The method according to claim 1, wherein said code portion comprises program-code-template for creating objects.

3. The method according to claim 1, wherein specified version of the software comprises a software plugin.

4. The method according to claim 1, wherein said centralized data management system is a file system.

5. The method according to claim 1, wherein said loading of said specified code portion preserves same name and path in different versions of all of the packages.

6. A system for dynamic loading of incremental changes of software in a centralized data management system, the system comprising:
   a plurality of interconnected nodes of said centralized data management system, each of the nodes having a computer processor and a memory, and a code update loader running on said computer processor,
   wherein said code update loader is configured to:
      request to load a specified code portion for a specified version of the software;
      check if said specified code portion is provided by a specified software package associated with said specified version;
      in a case that said specified code portion is provided by said specified software package, load the class from the specified package;
      in a case that said specified code portion is not provided by said specified software package, iteratively check in earlier packages upon which the specified package depends, until said specified code portion is found; and
      load said specified code portion from the earlier package where said specified code portion is found,
      wherein the specified code portion for the specified version of the software is a software plugin, wherein the software is a file system software and wherein the software plugin preserves same name and path in different versions of all of the packages.

7. The system according to claim 6, wherein said code portion comprises program-code-template for creating objects.

8. The system according to claim 6, wherein specified version of the software comprises a software plugin.

9. The system according to claim 6, wherein said centralized data management system is a file system.

10. The system according to claim 6, wherein said code update loader is configured to load said specified code portion while preserving same name and path in different versions of all of the packages.

11. A non-transitory computer readable medium for dynamic loading of incremental changes of software in a centralized data management system, the computer readable medium comprising a set of instructions that when executed cause at least one computer processor to:
request to load a specified code portion for a specified version of the software;
check if said specified code portion is provided by a specified software package associated with said specified version;
in a case that said specified code portion is provided by said specified software package, load the class from the specified package;
in a case that said specified code portion is not provided by said specified software package, iteratively check in earlier packages upon which the specified package depends, until said specified code portion is found; and
load said specified code portion from the earlier package where said specified code portion is found,
wherein the specified code portion for the specified version of the software is a software plugin, wherein the software is a file system software and wherein the software plugin preserves same name and path in different versions of all of the packages.

12. The non-transitory computer readable medium according to claim 11, wherein said code portion comprises program-code-template for creating objects.

13. The non-transitory computer readable medium according to claim 11, wherein specified version of the software comprises a software plugin.

14. The non-transitory computer readable medium according to claim 11, wherein said centralized data management system is a file system.

15. The non-transitory computer readable medium according to claim 11, wherein said loading of said specified code portion preserves same name and path in different versions of all of the packages.

* * * * *